US008529106B2

(12) United States Patent
Jung et al.

(10) Patent No.: US 8,529,106 B2
(45) Date of Patent: Sep. 10, 2013

(54) FOLDABLE DISPLAY DEVICE

(75) Inventors: Nils-Holger Jung, Weingarten (DE); Friedhelm Soeffge, Leonberg (DE); Joerg Tragatschnig, Zell am See (AT); Alexander Swatek, St. Michael (AT)

(73) Assignee: Global Bright Media Werbe GmbH, Vienna (AT)

( * ) Notice: Subject to any disclaimer, the term of this patent is extended or adjusted under 35 U.S.C. 154(b) by 0 days.

(21) Appl. No.: 13/378,416

(22) PCT Filed: Jun. 16, 2010

(86) PCT No.: PCT/EP2010/058425
§ 371 (c)(1),
(2), (4) Date: Feb. 28, 2012

(87) PCT Pub. No.: WO2010/146070
PCT Pub. Date: Dec. 23, 2010

(65) Prior Publication Data

US 2012/0147463 A1 Jun. 14, 2012

(30) Foreign Application Priority Data

Jun. 19, 2009 (DE) ........................ 10 2009 030 355

(51) Int. Cl.
*G03B 21/58* (2006.01)

(52) U.S. Cl.
USPC .......................................... 362/388; 359/459

(58) Field of Classification Search
CPC ...................................................... G09F 15/00
USPC ........................................ 359/443; 362/388
See application file for complete search history.

(56) References Cited

U.S. PATENT DOCUMENTS

| | | | | |
|---|---|---|---|---|
| 4,110,792 | A * | 8/1978 | Long et al. | 348/383 |
| 2005/0210722 | A1 | 9/2005 | Graef et al. | |
| 2006/0209547 | A1 * | 9/2006 | Biondo et al. | 362/388 |
| 2007/0044357 | A1 | 3/2007 | Biondo et al. | |

FOREIGN PATENT DOCUMENTS

| | | | |
|---|---|---|---|
| DE | 102007061473 | A1 | 12/2007 |
| EP | 01365376 | B1 | 9/2002 |
| JP | 1996-067439 | * | 3/1996 |
| JP | 8067439 | A | 3/1996 |
| KR | 1020010095719 | A | 7/2001 |
| WO | 02/33685 | A1 | 4/2001 |
| WO | 02/063449 | A2 | 8/2002 |
| WO | 2004/111808 | A1 | 12/2004 |
| WO | 2008/047970 | A1 | 4/2008 |
| WO | 2010/146070 | A1 | 12/2010 |
| WO | WO2013034566 | * | 3/2013 |

OTHER PUBLICATIONS

Translation of International Preliminary Report on Patentability in related PCT Application No. PCT/EP2010/058425.

* cited by examiner

*Primary Examiner* — Clayton E Laballe
*Assistant Examiner* — Kevin Butler
(74) *Attorney, Agent, or Firm* — Maschoff Brennan

(57) ABSTRACT

The invention relates to a foldable display device, consisting of several panels arranged in parallel to each other, which are movably connected with each other. In order to create a display device that may remain locally fixed, there is provided that the display device is not configured simply foldable but in addition is provided with a housing device, which may accommodate the display device in its folded condition.

13 Claims, 5 Drawing Sheets

FOLDABLE DISPLAY DEVICE

Figure 1:
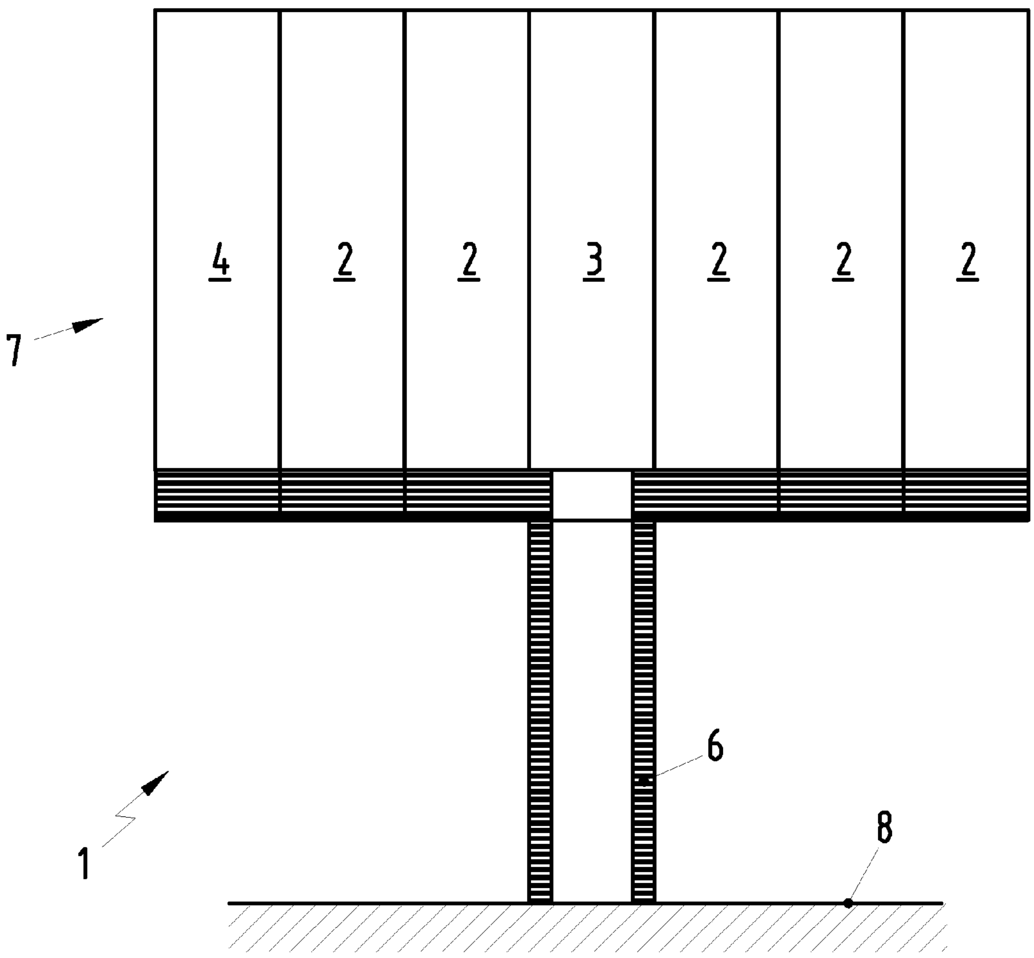

The invention relates to a foldable display device, comprising several panels arranged in parallel to each other, which are movably connected with each other.

Display devices, which are, for example, used for large screens, may be composed of several elements, in order to obtain a packaging dimension allowing for the transport or stowing away thereof. U.S. Pat. No. 4,110,792 shows a mobile large screen that is mounted hydraulically foldable on a semitrailer. The three-part screen is designed in the form of a triptych with a locally fixed central part. At the rear side of the central screen element there are provided hinges, which allow for folding in the two lateral screen parts behind the central screen. The display panels are designed as lamp matrix screen board for a black and white display.

From WO 2004/111808 there is further known a hinge, which is provided for connecting the elements of the display device and the special configuration of which makes it possible to reduce or completely close the hinge gap by means of a sliding movement in the case of an opened, this is unfolded display device. Similarly effective hinges are also known from the WO 02/063449 A2.

WO 02/33685 finally shows connecting and locking elements for foldable screens, also large screens. These screens may, among others, also be folded in the form of a leporello folding (see FIG. 11 therein).

Based on the prior art, it is the aim of the present invention to provide a display device that may remain locally fixed. According to the invention, there is provided that the display device is configured not simply foldable but in addition is also provided with a housing device, which may accommodate the display device in its folded condition. It is advantageous that due to the selected leporello folding the display device is designed to be easily folded, this is the display device is formed into a projection screen by folding up individual panels and it may similarly also be folded into a column in a space-saving way and, hence, may remain at the selected place as an attractive, architecturally designed stele. It is advantageous that in external use this form offers only a small contact area for possible weather influences, such as wind. Furthermore, it may also be lowered into the housing device.

Advantageous developments of the invention are displayed in the sub-claims.

There is provided that the display device is mounted on a stand designed as a support column and that the projection screen mounted on the stand consists of an odd number of panels, so that the central panel may be connected with the sand. The stand is to be arranged in the housing device so that it is slidable in the longitudinal direction of the housing device. There are provided respective driving elements to actuate movement. The central panel further is to be configured as to be pivotable about a longitudinal axis of the display device, this is in a horizontal plane; the latter either by means of a pivoting device between stand and central panel or by a pivoting device between housing device and stand. By means of these two possibilities of movement, this is lifting and pivoting, the display device may be lowered into the housing device for stowing away, on the one side, and, on the other side, and it may be oriented towards a viewer. Next to the central panel there are laterally situated respectively the half of the remainder panels, so that in total there is formed a leporello or zig-zag-folding with the central panel as a supporting panel.

In order to pivot the panels against each other, there are provided respectively above and underneath the panels hinges, wherein there is provided between two panels at least one of the hinges with a (pivoting) driving element. Such a pivoting drive is preferably be configured so that a first leaf of the hinge is provided in the region of the hinge axis with a driving wheel and that the second leaf of the hinge, which is pivotably connected with the first leaf via the hinge axis, has a driving device arranged remote from the hinge axis. Driving wheel and driving device are suitably connected with each other, for example, via a drive belt, a chain, gearwheels situated inbetween or another form of a gear. The first leaf of the hinge is thus connected with the first panel, and the second leaf of the hinge is connected with the second panel. The second hinge, which is arranged at the opposing side of the panels, has a similar configuration, but does not, however, have a driving element. As the driving device is situated behind the imaging front face, this may be securely arranged within the panel. Also the optical effect is thus improved, as only a part of the driving device projects beyond the panel. In order to further improve the optical effect, the hinges may be provided at the side of the panels with a driving element, at which there is situated a cable duct thus completely covering the driving device.

It is further advantageous if all driving devices of the individual panels of the display device are coupled with each other. In this way, there may be obtained a synchronous and simultaneous movement of all panels, resulting in an optically attractive folding movement. This coupling may be configured mechanically by the corresponding transfer means, or electrically, this is by corresponding actuation of the individual driving device. In connection with a pivoting movement of the central panel carrying in total the display device, it is further possible to obtain in total a linear unfolding movement. Therefore, all driving devices including the pivoting drive for the central panel are controlled correspondingly. This is not only optically attractive but rather makes it possible to unfold or fold, respectively, the display device also in difficult spatial conditions, for example if there are present obstacles in the vicinity of the display device. It is only natural that by means of the corresponding control there are depictable also other movement patterns.

Further there is proposed to use LEDs as light or picture elements, respectively. Due to the configuration of the display device as individual panels, there is formed for each panel a fringe area. LEDs may advantageously also be arranged into these fringe areas so that the fringe areas are not visible anymore when the display device is unfolded. Also other known light elements, such as, for example, LCD panels, always have a fringe area that becomes visible then in the display device.

The light elements further may be grouped in tile-like modules. A panel consists of frame elements, preferably made of aluminium profiles that are combined in a frame structure so that there is formed an as good as possible overall stability (natural frequency, wind, and so on). Within the panel there are accommodated in the corresponding holds respectively several of these tile-like modules. The feed lines to the modules are arranged within the individual panels. The panel thus acts as a supporting element behind the individual modules and, hence, is not visible when the display device is unfolded. In the case of a defect the individual modules may be simply exchanged. Also the assembly of the display device is simplified by the configuration of tile-like modules; in particular standard or commercially available modules may be used and separately produced in a simple way in the form of a box of building blocks in various building dimensions of the display device. By means of aeration and ventilation openings, there is guaranteed a sufficient ventilation of the closed frame structure.

The housing device forms a shaft-like foundation for the display device. Also this display device may be designed in a space-saving configuration, for example as pipes or as a grilled tubular frame, as it has to accommodate the display device only its folded condition. Within the tube there is arranged a lifting device for the display device so that the display device may be lowered in its folded condition and then be extended again. Within the rube there is further provided a guiding device for the necessary feed lines to the display device, such as, for example, for signal and energy cables. Finally, there is provided at the bottom of the pipe a bilge device serving the purpose that entering water will not accrue in the pipe but is rather discharged to the outside. For this purpose, there may be used known bilge devices like bilge pumps, drainage pipes, etc. In order to secure the housing device against the entry of water, the housing device may further be closed on the top side by a rotatable cover plate. An opening provided in the cover plate corresponds to the cross-section of the stand in this region, leaving only a small gap. As it may be rotated, the cover plate may move together with the stand. In order to provide for a closing of the housing device sealed upwards in the case of a lowered display device, such a cover plate may in addition be provided with horizontally movable plates, which may simply be slided or moved via a four-hinge-mechanism into their locking position.

In total, there is provided a display device that may be formed into a large screen, wherein a projection screen with LED technology may also be lowered into the ground by folding into a column. Because of the aesthetics of the unfolded as well as folded projection screen, there is formed an attractive architectural element with clear and precise external contours, as few projecting individual elements as possible and the arrangement of all feed lines underneath the outer shell.

Figure 2:
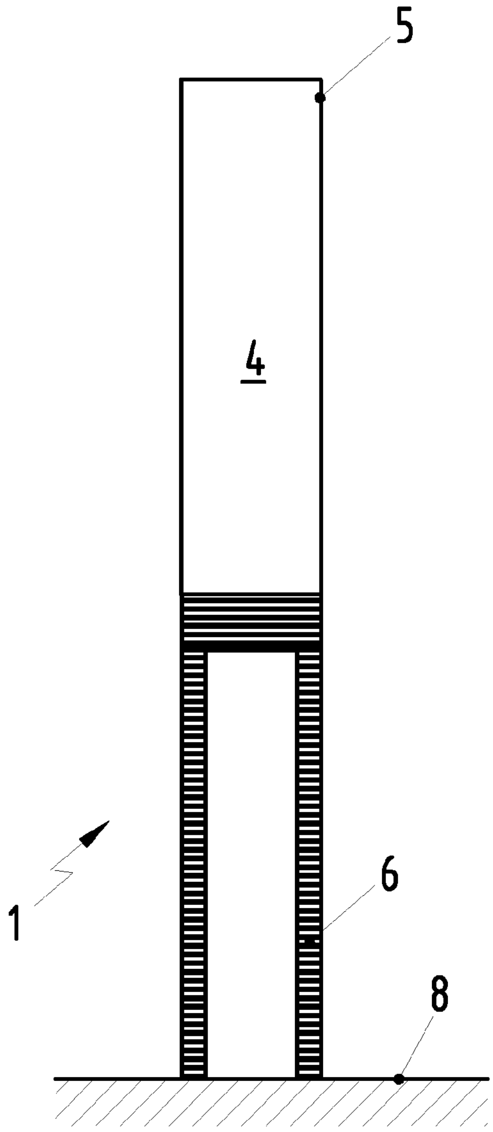
Figure 3:
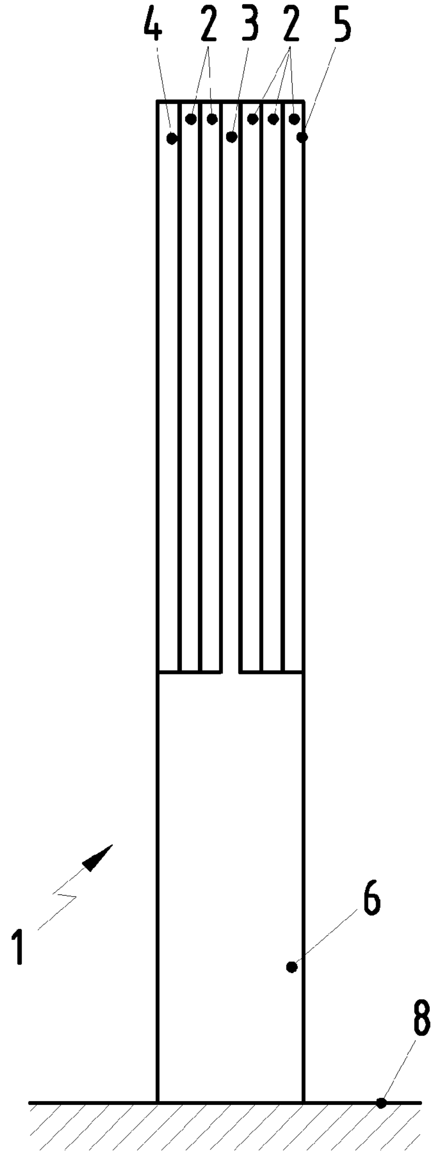
Figure 4:
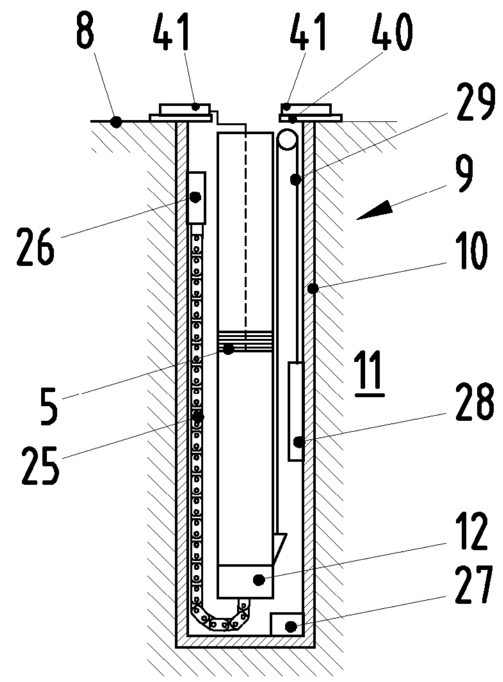
Figure 5:
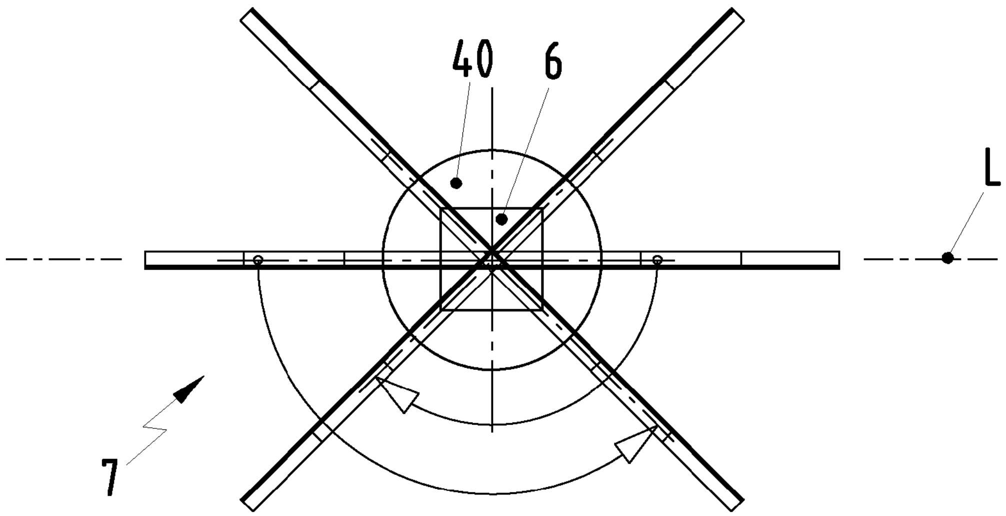
Figure 6:
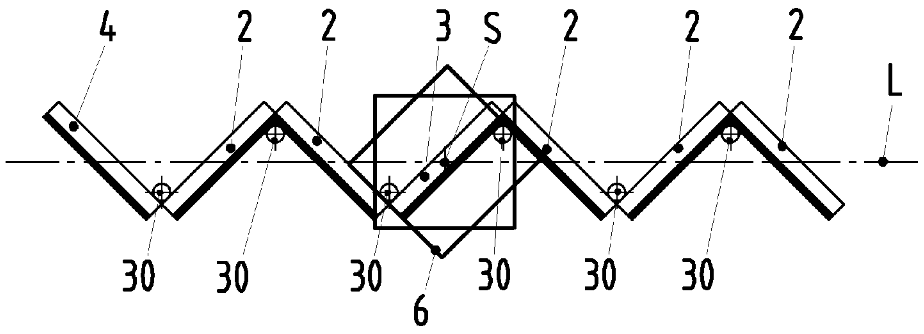
Figure 8:
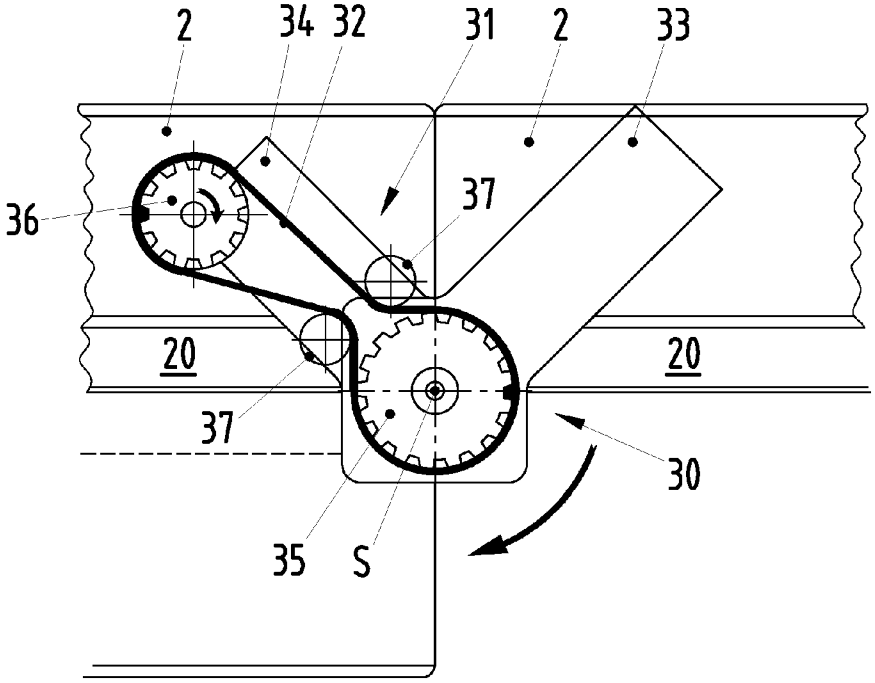
Figure 7:
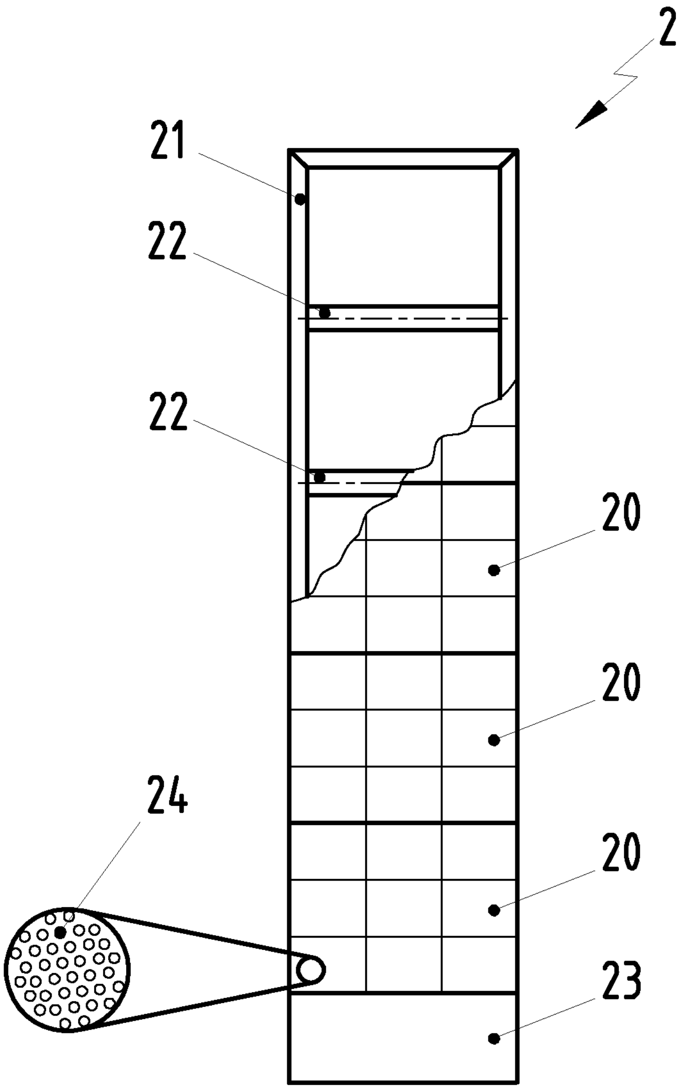

The invention is in the following described in greater detail by way of the illustrative embodiment displayed in the figure, wherein:

FIG. 1 shows a foldable display device in the unfolded condition in a front view, FIG. 2 shows the display device in its folded condition, FIG. 3 shows the display device in its folded condition in the lateral view, FIG. 4 shows a housing device for the display device in a sectional view, FIG. 5 shows a pivoting area of the display device in a top view, FIG. 6 shows an intermediate condition, when the display device is unfolded, in a top view FIG. 7 shows an individual panel in a front view with a partial section and FIG. 8 shows a hinge situated at the bottom between two panels.

FIG. 1 shows a foldable display device 1 formed as a large screen in a front view. The display device 1 consists of seven panels 2, 3 and 4 arranged in parallel to each other, which are movably connected with each other at their longitudinal sides. FIG. 2 shows the display device 1 in its folded condition. The display device 1 is therein folded together in the form of a stele 5. The outer panel 4 forms the front-side end of the stele 5, wherein the outer panel 4 is arranged so that its display side (in the drawing depicted by a thicker line) faces towards the front side. FIG. 4 shows the stele 5 in a lateral view.

The display device 1 is further provided with a stand 6 in the form of a support column serving the purpose to arrange the panels 2 to 4 forming a projection screen 7 distanced to a surface 8, wherein the stand is intended to accommodate all loads developing. The central panel 3 is mounted on the stand 6 and supports the further panel 2 as well as the panel 4.

As shown in FIG. 4, the display device 1 that may folded into a stele 5 may be lowered into a housing device 9. The housing device 9 consists of a pipe that is closed at the end and may be lowered into the ground 11. The stele 5 is then completely accommodated by the housing device 9 so that it is situated underneath the surface 8 when it is lowered. The stele 5 is arranged in the pipe 10 via lateral guidings and rolls so that the stele 5 is slidable, on the one side, in the longitudinal direction of the housing device 9 and, on the other side, torques that are formed at the stand 6 may be supported. The pipe 10 is formed as a dry chamber. Therefore, the pipe 10 is closed at its upper side by a cover and provided on its bottom side with a bilge pump 27. The cover consists of a rotatable cover plate 40 with an opening corresponding to the cross-section of the stand 6. On the cover plate 40 there are provided two horizontally slidable plates 41 in order to cover the pipe 10 sealed upwards when the display device 1 is lowered.

An electric lifting drive for the stand 6 is formed as a chain drive. A worm geared motor 28 mounted at the internal wall of the pipe 10 drives a chain 29 rigidly connected with the stand 6.

Underneath the surface 8, the display device 1 is mounted rotatable in a support ball bearing and pivotable by an electric pivoting drive 12. In this way, the stand 6 and, hence, also the projection screen 7 may be oriented across a wide range towards the viewer. FIG. 5 shows in a top view the pivoting area of the projection screen 7 in an angular range off 135°.

The pivoting drive 12 is further used for space-saving unfolding of the projection screen 7. FIG. 6 shows in a top view an intermediate condition, when the projection screen 7 is unfolded. In this illustration it is clearly visible that there is formed a zig-zag- or leporello folding by the alternate connection of the panels 2 to 4 with each other. During the unfolding of the projection screen 7, the pivoting device 12 pivots the stand 6 and thus also the central panel 3 connected therewith. The further panels 2 and 4 are synchronously also pivoted so that the projection screen unfolds in total alongside its longitudinal axis L. Folding of the projection screen 7 is realized in the same way. After the projection screen 7 has been folded in this way into the stele 5, the pivoting device 12 then has to rotate the stand 6 for further 90°, so that the outer panel 4 again faces the viewer with its imaging display side (indicated by the thicker line). Now the outer panel 4 at the stele 5 may be used for displaying current information such as time, barometric or barographic data, temperature, advertisement, etc.

FIG. 7 shows an individual panel 2 in a front view. The imaging front side of the panel 2 consists of five tile-like display modules 20. On the rear side, there is provided a support structure consisting of a circumferential frame structure 21 with cross members 22 and optionally further reinforcement elements. The elements of the frame structure 21 as well as the cross members 22 are made of hollow aluminium profiles, which are fittingly assembled across the corresponding connection parts made of plastic material. The modules 20 are respectively mounted at the frame 21 or the cross members, respectively. The modules 20 in turn may be composed of smaller display modules, and in the exemplary embodiment they are equipped with LED 24 as light elements. The imaging display side of the panel consists of 5 modules 20, which are in turn each composed of 9 LED tiles (LED-IM). The tiles are screwed onto a plate and in this way form with the electronic control the module 20, which is then screwed together with the frame 21.

The space behind the modules 20 offers sufficient space in order to accommodate power supplies and video processors as well as for arranging the feed lines, which then are combined in a cable duct 23 at the bottom side of the panels 2 to 4. The cable ducts 23 of the individual panels 2 to 4 form in total a cable feed to the stand 6. Within the stand 6 the feed lines are guided through a further cable duct not further detailed into the tube 10 so that these accompany the pivoting movements of the display device as secured against turning as possible. A cable carrier chain 25 guides the feed lines further to a terminal box 26 situated at the inside of the tube 10. The cable carrier chain 25 is rigidly connected with the stand 6 and tube 10 and may unroll at the inside of the tube 10 so that the feed lines are securely arranged and guided.

At the rear side, the panels 2 are closed by a cover mounted on the frame 21, into which there are also introduced aeration and ventilation openings.

The projection screen 7 consists in total of seven panels 2 to 4, which are connected with each other by means of 180° hinges, so that they may be folded like an accordion, according to a leporello folding principle. Each hinge 30 has an opening angle of 180° and is configured similar to a door hinge. Within the hinge 30 there are accommodated the loads and rotation movements in highly precise roller bearings making the function be securely managed when folding the projection screen 7. Respectively one hinge 30 is mounted at the upper and lower sides of the frame of the panels 2 to 4, in this way guaranteeing exact movement of the panels 2 to 4. In addition, the centre of each frame structure 21 is supported by a centralizing and mounting pin providing for further fixation and positioning of the panels 2 to 4 in regard to each other.

FIG. 8 shows a hinge 30 mounted on the bottom between two panels 20, wherein a driving element 31 provides folding or pivoting, respectively, via a drive belt. Each hinge has two leaves 33, 34 that are connected with each other alongside a hinge axis S. The hinge axis S is arranged so that it rests slightly above the surface of the panel 2—in the example shown the surface is formed by the modules 20 and the hinge axis S about 1 mm above, so that in the folded condition there is formed a gap of about 2 mm, this is the distance between the hinge axis S and the surface of the panels 2 determines the distance between the panels 2 from each other in the folded condition; it ought to be as small as possible in order to prevent the formation of an interfering gap within the stele 5, but, on the other side, it ought to be big enough in order to prevent contact of the LEDs at the front side of the panels 2 and 3 in the folded condition of the projection screen.

The first leaf 33, which is attached in FIG. 8 at the right panel 20', has a driving device 35, herein a gearwheel for the drive belt 32. The second leaf 34, on the other side, which is attached in the exemplary embodiment according to FIG. 8 at the left panel 20, is provided concentrically to the hinge axis S with a driving wheel 36, which is wrapped by the drive belt 32. Two idler pulleys 37 attached at the first leaf 33 provide for a big wrap angle of the drive belt 32 at the driving wheel 36.

LIST OF REFERENCE NUMBERS

Number Designation
1 Display Device
2 Panel
3 Panel
4 Outer Panel
5 Stele
6 Stand
7 Projection Screen
8 Surface
9 Housing Device
10 Pipe
11 Ground
12 Electric Pivoting Drive
20 Display Modules
21 Frame Structure
22 Cross Members
23 Cable Duct
24 LED
25 Cable Carrier Chain
26 Terminal Box
27 Bilge Pump
28 Worm Geared Drive Motor
29 Chain
30 Hinges
31 Drive Element
32 Drive Belt
33 Hinge Leaf
33 First Leaf
34 Hinge Leaf
34 Second Leaf
35 Driving Device
36 Driving Wheel
37 Idler Pulleys
40 Cover Plate
41 Plates
L Longitudinal Axis
S Hinge Axis

The invention claimed is:

1. A foldable display device, comprising several panels arranged in parallel to each other, which are movably connected with each other, wherein connection elements are arranged so that there is formed in total a leporello folding, wherein there is provided a housing device, which may be arranged lowered in the ground and is tightly closeable upwards, which may completely accommodate the displace device in a folded condition.

2. A display device according to claim 1, wherein the display device is arranged on a stand and that there is provided an odd number of panels, wherein the central panel is connected with the stand.

3. A display device according to claim 2, wherein the stand in the housing device is arranged so that it is slidable, on the one side, in the longitudinal direction of the housing device and, on the other side, mounted pivotable about the longitudinal axis of the central panel, and wherein for both movements there is provided respectively one driving element.

4. A display device according to claim 3, wherein there are provided as connecting elements arranged above and underneath the panels hinges, which connect respectively two panels movably with each other, wherein there is provided respectively at least one of the hinges with a driving element.

5. A display device according to claim 4, wherein the driven hinge comprises two leaves, wherein the first leaf is connected with a first panel and provided in the region of the hinge axis with a driving wheel and wherein the second leaf is connected with a second panel and has a driving device, which is arranged remote from the hinge axis and connected with the driving wheel.

6. A display device according to claim 5, wherein all driving devices of the display device are coupled with each other.

7. A display device according to claim 6, wherein each panel is provided at its front side with LEDs as light or picture elements.

8. A display device according to claim 1, wherein each panel is provided at its front side with LEDs as light or picture elements.

9. A display device according to claim 8, wherein the light elements of the panels are grouped in tile-like modules, wherein the modules are each accommodated in a panel-side hold and wherein the feed lines to the modules are arranged within the panel.

10. A display device according to claim 9, wherein the housing device comprises a pipe that is arranged lowered in the ground, and that the pipe is arranged at the end of a rotatably arranged cover plate, the opening of which corresponding to the cross-section of the stand, and at which there are provided further movable plates, by means of which the opening may be closed.

11. A display device according to claim 1, wherein the housing device comprises a pipe that is arranged lowered in the ground, and that the pipe is arranged at the end of a rotatably arranged cover plate, the opening of which corresponding to the cross-section of the stand, and at which there are provided further movable plates, by means of which the opening may be closed.

12. A display device according to claim 11, wherein a lifting device as well as a guiding device are arranged for the feed lines to the display device within the pipe and that the lifting device and the guiding device are arranged so that they remain within the pipe even upon complete extension of the display device.

13. A method for unfolding a foldable display device, comprising several panels arranged in parallel to each other, which are respectively foldable connected with each other and together form a projection screen, wherein the projection screen is configured pivotable, wherein a pivotable panel is pivoted during the unfolding of further panels so that there is developed in total a substantially linear unfolding movement alongside a longitudinal axis of the projection screen.

* * * * *